(12) United States Patent
Tawaragi

(10) Patent No.: US 6,341,110 B1
(45) Date of Patent: Jan. 22, 2002

(54) PRE-PIT SIGNAL DETECTING APPARATUS AND INFORMATION RECORDING APPARATUS

(75) Inventor: Yuji Tawaragi, Saitama-ken (JP)

(73) Assignee: Pioneer Corporation, Tokyo-to (JP)

( * ) Notice: Subject to any disclaimer, the term of this patent is extended or adjusted under 35 U.S.C. 154(b) by 0 days.

(21) Appl. No.: 09/387,897

(22) Filed: Sep. 1, 1999

(30) Foreign Application Priority Data

Sep. 3, 1998 (JP) .......................................... 10-249775

(51) Int. Cl.[7] .............................................. G11B 7/00
(52) U.S. Cl. ................ 369/47.2; 369/47.21; 369/47.22; 369/47.28
(58) Field of Search .............................. 369/47.2, 47.21, 369/47.22, 47.28, 44.13, 275.3, 59.2

(56) References Cited

U.S. PATENT DOCUMENTS 5,875,163 A * 2/1999 Kuroda et al. ............. 369/47.2

* cited by examiner

Primary Examiner—Nabil Hindi

(74) Attorney, Agent, or Firm—Young & Thompson

(57) ABSTRACT

A pre-pit signal detecting apparatus is used in an information recording apparatus for recording record information onto a record medium on which record control information for controlling a recording operation is recorded in advance by forming a pre-pit on the record medium, and detects a pre-pit signal corresponding to the pre-pit when the information recording apparatus records the record information onto the record medium. The pre-pit signal detecting apparatus is provided with: an extracting device, to which a reproduction signal of the record medium is inputted, for extracting and outputting a predetermined signal component, which is used for detecting the pre-pit signal, out of the inputted reproduction signal; an input controlling device for inputting a standard signal, which is set in advance, to the extracting device in place of the reproduction signal before the pre-pit signal is detected and inputting the reproduction signal to the extracting device when the pre-pit signal is detected; a phase difference detecting device for comparing the standard signal outputted by the extracting device with the standard signal inputted by the input controlling device, and for detecting a phase difference generated between the compared standard signals due to an extracting operation of the extracting device before the pre-pit signal is detected; and a pre-pit detecting device for detecting the pre-pit signal on the basis of the extracted predetermined signal component while canceling the detected phase difference.

10 Claims, 9 Drawing Sheets

PRE-PIT SIGNAL DETECTING APPARATUS AND INFORMATION RECORDING APPARATUS

BACKGROUND OF THE INVENTION

1. Field of the Invention

The present invention relates to a pre-pit signal detecting apparatus, which detects a pre-pit when recording record information, if various record control information required for recording the record information is recorded on a WO (Write Once) type record medium (hereafter, it is referred to as a "DVD-R (DVD-Recordable)") or a random access type record medium (hereafter, it is referred to as a "DVD-R/W (DVD-Read/Write)") where a plurality of recording/reproducing operations are possible, among high dense record media represented by the DVD, whose record density is drastically improved over a conventional CD (Compact Disk) and the like, by forming the pre-pit as pre-information. The present invention also relates to an information recording apparatus which has the pre-pit signal detecting apparatus and records the record information to be primarily recorded.

2. Description of the Related Art

For example, a synchronization signal, address information required for searching a position when recording the record information to be recorded such as video information, rotation control information used for the rotation control of the record medium, clock information to generate a record clock signal used when recording the record information onto the record medium and so on are recorded as the above-mentioned record control information (hereafter, the record control information is abbreviated and referred to as "pre-information") in many cases.

As a manner of actually recording the pre-information on the record medium, the rotation control information, the clock information and the like are recorded in many cases by wobbling so-called groove tracks or land tracks and thereby correlating the wobbling cycle (period) thereof with the rotation control information, the clock information and the like.

On the other hand, the address information, the synchronization signal and the like are typically recorded by forming pre-pits (i.e., pre-pits formed on a track (for example, the land track) formed between a plurality of turns of the track (for example, it is the groove track, which is wobbled at the wobbling frequency) on which the record information in the record medium is recorded) at an interval synchronous to the wobbling cycle on the record medium in advance.

In case of recording the record information onto the record medium, it is necessary to accurately detect each pre-information, in order to accurately record the record information.

Here, in the information recording apparatus, when respectively detecting the pre-information, the respective pre-information is detected by (i) obtaining a composite signal in which an impulse signal (hereafter, referred to as a pre-pit signal) corresponding to the pre-pit is superimposed on a cyclic signal (hereafter, referred to as a wobbling signal) having a cycle corresponding to the wobbling on the basis of a reflection light of a record light beam, which is irradiated onto each track on the record medium (the reason why such a composite signal is detected is that the pre-pit is formed as a phase pit on a land track adjacent to a wobbled groove track, and then the record light beam is simultaneously irradiated onto the groove track and the phase pit), and (ii) then separating the rotation control information, the clock information and the like which are recorded through the wobbling, and the address information, the synchronization signal and the like which are recorded through the pre-pit, from the composite signal.

More actually, in case of detecting the wobbling signal from the composite signal, the composite signal is passed through a band pass filter in which a frequency of the wobbling signal is used as a central frequency, and accordingly the wobbling signal is extracted.

Also, in case of detecting the pre-pit signal from the composite signal, a gate signal, which has a phase synchronous with that of the extracted wobbling signal and also includes a timing at which the pre-pit is present, is generated to then extract a part of the composite signal (i.e., a part in which the pre-pit signal is included) through this gate signal and further detect the pre-pit signal from this extracted signal.

At this time, in case of generating the gate signal, in order to make the phase thereof synchronous with the extracted wobbling signal, it is necessary to frequency-divide a record clock signal synchronous with a moving speed of the record medium to thereby generate the gate signal.

In this case, a so-called PLL (Phase Locked Loop) circuit is required for generating the gate signal.

However, typically in the band pass filter and the PLL circuit (especially, a phase comparator usually contained in the PLL circuit), phase delays are respectively induced in signals passed through them because of operational performances.

Thus, the gate signal, which is passed through the band pass filter and the phase comparator and is generated from the composite signal in accordance with the above-mentioned procedure, has a problem that a duration while the gate signal is at a "HIGH" level may not agree with the timing in which the pre-pit signal in the composite signal is included, because of the phase delay.

Hence, in this case, the pre-pit signal cannot be detected even if using the gate signal.

Moreover, a variation of a characteristic of each member constituting the band pass filter and the PLL circuit (i.e., a deviation from a nominal value), a difference of a temperature characteristic and the like may cause the phase delay to be changed for each information recording apparatus or for each environment where the recording operation is carried out. In this case, the duration while the gate signal is at the "HIGH" level and the timing in which the pre-pit is included are further deviated or shifted from each other.

So, in order to cancel this deviation between the gate signal and the pre-pit signal and accurately detect the pre-pit signal, a pulse width of the gate signal (i.e., the duration while the gate signal is at the "HIGH" level) may be set to be longer to some degree, and accordingly the duration while the gate signal is at the "HIGH" level and the timing in which the pre-pit is included are made coincident with each other.

However, in the actual information recording apparatus, various noises other than the pre-pit signal are typically mixed into the above-mentioned composite signal.

Thus, this case has a problem that, if the pulse width of the gate signal is made wider as mentioned above, the noises are also extracted, and conversely the pre-pit signal cannot be accurately detected.

In other words, in order to detect the pre-pit signal having a predetermined phase relation with the wobbling signal at a high precision (namely, without detecting other noises and the like), it is necessary to make the pulse width of the gate signal used for the detection as narrow as possible. However, the above mentioned method cannot make the pulse width sufficiently narrow because of the above mentioned phase delay.

SUMMARY OF THE INVENTION

The present invention is proposed in view of the above mentioned problems. It is therefore an object of the present invention to provide a pre-pit signal detecting apparatus, which can detect the above-mentioned pre-pit signal precisely and accurately among the respective signals corresponding to the above-mentioned pre-information, and an information recording apparatus which includes the pre-pit signal detecting apparatus.

The above object of the present invention can be achieved by a first pre-pit signal detecting apparatus, which is used in an information recording apparatus for recording record information onto a record medium such as a DVD-R etc., on which record control information for controlling a recording operation of the information recording apparatus is recorded in advance by forming a pre-pit on the record medium, for detecting a pre-pit signal corresponding to the pre-pit when the information recording apparatus records the record information onto the record medium. The first pre-pit signal detecting apparatus is provided with: an extracting device such as a band pass filter etc., to which a reproduction signal of the record medium is inputted, for extracting and outputting a predetermined signal component, which is used for detecting the pre-pit signal, out of the inputted reproduction signal; an input controlling device such as a CPU etc., for inputting a standard signal, which is set in advance, to the extracting device in place of the reproduction signal before the pre-pit signal is detected and inputting the reproduction signal to the extracting device when the pre-pit signal is detected; a phase difference detecting device such as a delay amount measuring device etc., for comparing the standard signal outputted by the extracting device with the standard signal inputted by the input controlling device, and for detecting a phase difference generated between the compared standard signals due to an extracting operation of the extracting device before the pre-pit signal is detected; and a pre-pit detecting device such as a delay circuit etc., for detecting the pre-pit signal on the basis of the extracted predetermined signal component while canceling the detected phase difference.

According to the first pre-pit signal detecting device, since the phase difference generated in the extracting device used for the detection of the pre-pit signal is detected in advance and then the actual detection of the pre-pit signal is performed while canceling this detected phase difference, it is possible to accurately detect the pre-pit signal.

In one aspect of the first pre-pit signal detecting apparatus, the extracting device is provided with: a filtering device such as a band pass filter etc., for extracting a partial signal including the pre-pit signal from the reproduction signal, which is generated in response to a reflection light of a recording light beam irradiated onto the record medium; and a gate signal generating device such as a PLL (Phase Lock Loop) circuit etc., for generating a gate signal to extract the pre-pit signal from the extracted partial signal.

According to this aspect, by canceling the phase difference generated in the filtering device and the gate signal generating device, it is possible to accurately detect the pre-pit signal.

In this aspect, the pre-pit detecting device may be provided with a phase controlling device for controlling a phase of the extracted partial signal so as to cancel the detected phase difference and then outputting it to the gate signal generating device.

By this, it is possible to certainly cancel the phase difference.

The above object of the present invention can be also achieved by a second pre-pit signal detecting apparatus, which is used in an information recording apparatus for recording record information onto a record medium such as a DVD-R etc., on which record control information for controlling a recording operation of the information recording apparatus is recorded in advance by forming a pre-pit and a wobbling track having a phase corresponding to the pre-pit on the record medium, for detecting a pre-pit signal corresponding to the pre-pit from a reproduction signal corresponding to a reflection light of a recording light beam irradiated onto the record medium when the information recording apparatus records the record information onto the record medium. The second pre-pit signal detecting apparatus is provided with: a first detecting device such as a pre-pit signal detector etc., for detecting the pre-pit signal corresponding to a plurality of pre-pits on the basis of a gate signal to extract the pre-pit signal from the reproduction signal; a second detecting device such as a wobbling signal detector etc., for detecting a wobbling signal corresponding to a wobble of the wobbling track; a phase difference detecting device such as a gate position corrector etc., for detecting a phase difference between (i) the wobbling signal corresponding to the detected pre-pit signal and (ii) the detected pre-pit signal, for the wobbling signal in a plurality of cycles thereof; an averaging device such as a gate position corrector etc., for averaging the detected phase difference over the plurality of cycles of the wobbling signal; and a gate signal generating device such as a gate generator etc., for generating the gate signal on the basis of the averaged phase difference.

According to the second pre-pit signal detecting apparatus, since the phase difference between the detected wobbling signal and the detected pre-pit signal is averaged and then the gate signal for the detection of the pre-pit signal is generated on the basis of the averaged value, it is possible to generate the gate signal corresponding to the timing when the pre-pit signal is generated.

In one aspect of the second pre-pit signal detecting apparatus, the gate signal generating device generates the gate signal so that the averaged phase difference is coincident with a central timing of the gate signal.

By this, since the gate signal is generated so that the averaged phase difference is coincident with the central timing of the gate signal, such a possibility is more increased that the timing when the pre-pit signal is generated and the central timing of the gate signal are coincident with each other. Hence, it is possible to certainly detect the pre-pit signal even if the pulse width of the gate signal is narrowed.

Therefore, even if there is a change in the phase characteristic due to the temperature characteristic of the constitutional elements and the like (e.g., even if there is apparently generated a shift in the phase relationship between the wobbling signal and the pre-pit signal), since the gate signal can be generated such that the timing when the pre-pit signal is generated is coincident with the central timing of the gate signal, it is possible to reduce the detection leakage of the pre-pit signal.

The above object of the present invention can be also achieved by a first information recording apparatus for recording record information onto a record medium on which record control information for controlling a recording operation of the information recording apparatus is recorded in advance by forming a pre-pit on the record medium. The first information recording apparatus is provided with (A) the above described first pre-pit signal detecting apparatus of the present invention in various aspects, and (B) a recording device for recording the record information onto the record medium on the basis of the detected pre-pit signal.

According to the first information recording apparatus, since it is provided with the above described first pre-pit signal detecting apparatus of the present invention, it is possible to more accurately detect the pre-pit signal and accurately record the record information by more accurately obtaining the record control information.

The above object of the present invention can be also achieved by a second information recording apparatus for recording record information onto a record medium on which record control information for controlling a recording operation of the information recording apparatus is recorded in advance by forming a pre-pit and a wobbling track having a phase corresponding to the pre-pit on the record medium. The second information recording apparatus is provided with (A) the above described second pre-pit signal detecting apparatus of the present invention in various aspects, and (B) a recording device for recording the record information onto the record medium on the basis of the detected pre-pit signal.

According to the second information recording apparatus, since it is provided with the above described second pre-pit signal detecting apparatus of the present invention, it is possible to more accurately detect the pre-pit signal and accurately record the record information by more accurately obtaining the record control information.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Next, preferred embodiments of the present invention will be explained below with reference to the attached drawings.

In the following explanations, the present invention is applied to an information recording apparatus for recording record information onto a DVD-R (DVD-Recordable), as an information record medium on which the above mentioned pre-information is recorded in advance as the record control information.

(I) Record Medium

At first, a DVD-R on which a pre-pit corresponding to the pre-information is formed and the record control information is recorded by wobbling a later described groove track at a predetermined frequency is explained with reference to FIG. 1 and FIG. 2.

Figure 1:
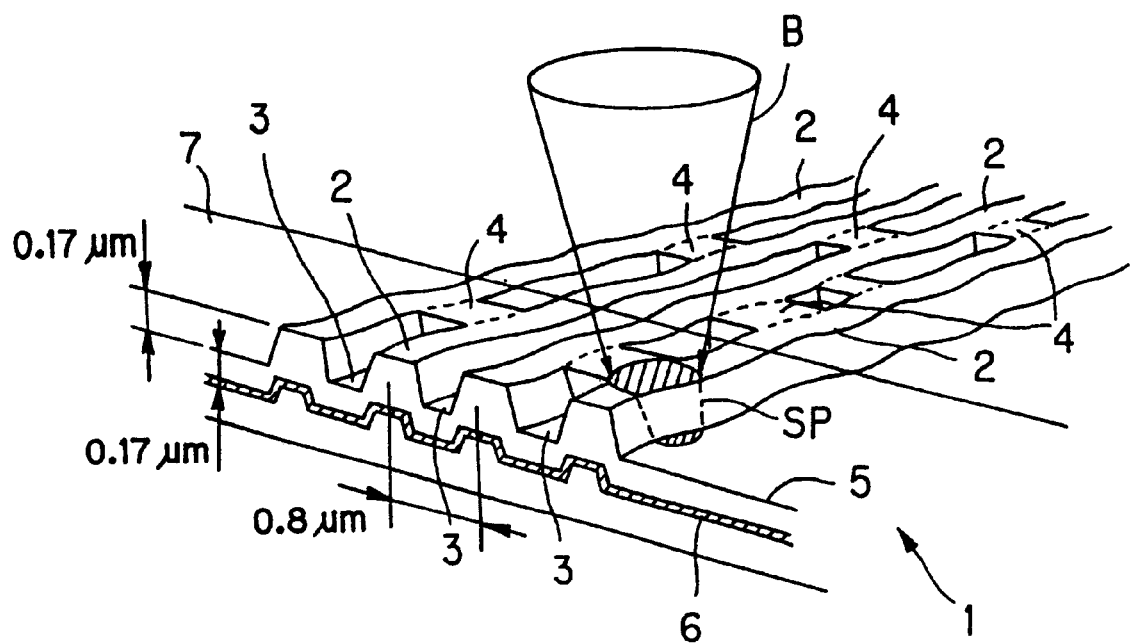
FIG. 1 is a perspective view showing one example of a structure of a DVD-R used in embodiments.
Figure 2:
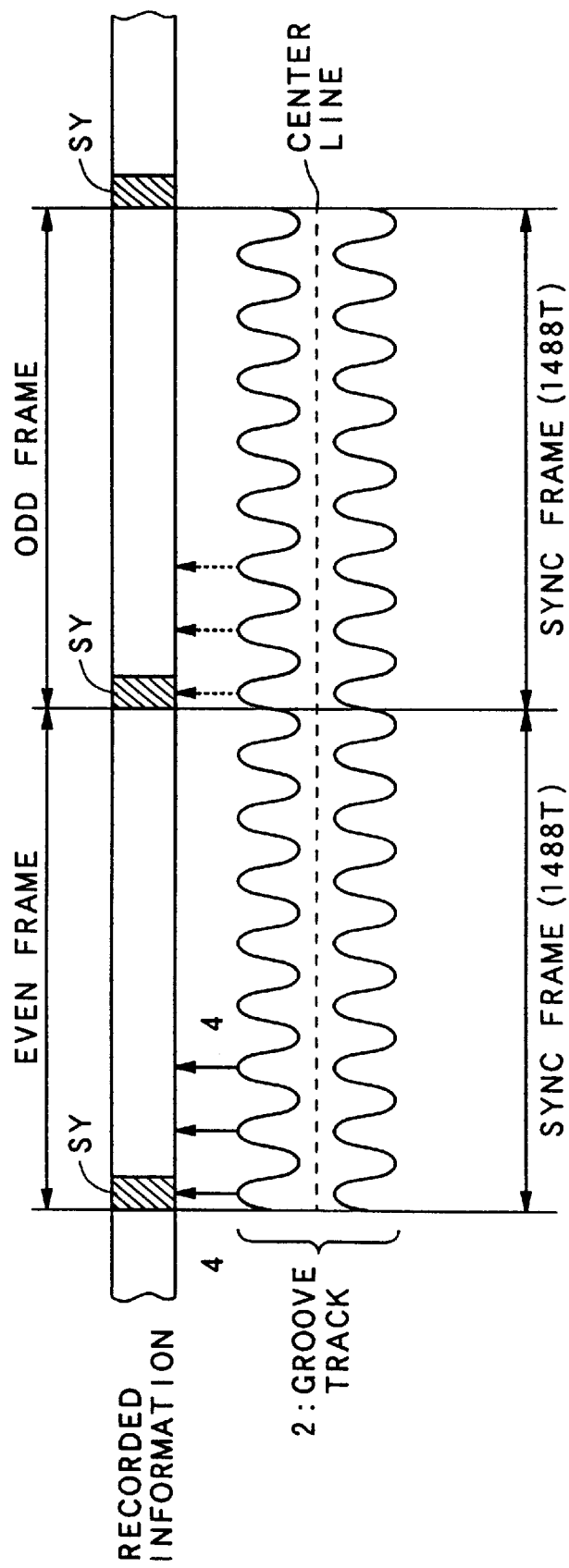
FIG. 2 is a diagram showing an example of a recording format of the DVD-R used in the embodiment.

FIG. 1 is a perspective view showing an example of the structure of the DVD-R used in embodiments, and FIG. 2 is a diagram showing a recording format of the DVD-R.

At first, the structure of the DVD-R used in the embodiments is explained with reference to FIG. 1.

In FIG. 1, a DVD-R 1 is a pigment type DVD-R, which has a pigment film 5 and to which information can be written only once. The DVD-R 1 is provided with a groove track 2 serving as one example of an information record track and a land track 3 serving as one example of a guide track to guide into the groove track 2 a light beam B, such as laser beam or the like, serving as one example of a reproduction light or a record light. Also, it is provided with a protection film 7 for protecting them and a gold deposition surface 6 for reflecting the light beam B when the recorded information is reproduced. Then, a pre-pit 4 corresponding to pre-information of the DVD-R 1 is formed on this land track 3. This pre-pit 4 is formed in advance in a process of manufacturing the DVD-R 1.

Moreover, in the DVD-R 1, the groove track 2 is wobbled at a frequency corresponding to a rotation speed of the DVD-R 1. An operation of recording the rotation control information through the wobbling of the groove track 2 is carried out in advance in the process of manufacturing the DVD-R 1 before its shipment, similarly to the pre-pit 4.

Then, when the record information (hereafter, this implies information which is primarily recorded, such as video information and the like, other than the pre-information) is recorded on the DVD-R 1, an information recording apparatus described later samples the frequency of the wobbling of the groove track 2 and detects the pre-pit 4 to thereby obtain the pre-information, so as to control the rotation of the DVD-R 1 at a predetermined rotation speed by those values.

Along with this, an optimal output of the light beam B as a recording light etc., is set on the basis of the obtained pre-information, and the address information indicative of the position on the DVD-R1 at which the record information is to be recorded etc., is obtained, so that the record information is recorded at the record position on the basis of the address information.

Here, when the record information is recorded, it is recorded by irradiating the light beam B so that a center thereof coincides with a center of the groove track 2 and then forming a record information pit corresponding to the record information on the groove track 2. At this time, a size of a light spot SP is set such that a part thereof is irradiated onto the land track 3 as well as the groove track 2, as shown in FIG. 1. Then, by using a reflection light of this part of the light spot SP irradiated on the land track 3, the pre-information is detected and obtained by the push-pull method (i.e., the push-pull method using a light detector divided by a division line parallel to a rotation direction of the DVD-R 1 (which is referred to as "radial push pull method" hereinafter)). By using the reflection light from the light spot SP irradiated on the groove track 2, the wobbling signal as the pre-information is detected, so that the clock signal for rotation control etc., is obtained from the groove track 2.

Next, the record format of the pre-information recorded in advance on the DVD-R 1 in this embodiment will be described below with reference to FIG. 2.

In FIG. 2, an upper stage shows a record format in the record information, and a wave form at a low stage shows a wobbling state of the groove track 2 for recording the record information (corresponding to a plan view of the groove track 2), and each upward arrow between the wobbling state of the groove track 2 and the record information diagrammatically indicates a location on which the pre-pit 4 is formed. Here, in FIG. 2, the wobbling state of the groove track 2 is indicated by using an amplitude larger than an actual amplitude, for easy understanding, and the record information is recorded on a central line of the groove track 2.

As shown in FIG. 2, in this embodiment, the record information to be recorded onto the DVD-R 1 is divided for each synchronization frame serving as one example of an information unit, in advance. Then, one recording sector is composed of 26 synchronization frames. Moreover, one ECC (Error Correcting Code) block is composed of 16 recording sectors.

In addition, one synchronization frame has a length equal to 1488T times (1488T) of the unit length (hereafter, referred to as T) corresponding to a bit interval prescribed by the record format when the record information is recorded. Moreover, a synchronization information SY necessary for the synchronization for each synchronization frame is recorded on a portion of a length corresponding to a lead 14T of one synchronization frame.

On the other hand, the pre-information to be recorded on the DVD-R 1 in this embodiment is recorded for each synchronization frame.

When the pre-information is recorded by use of the pre-pit 4, one pre-pit 4 to indicate the synchronization signal in the pre-information is always formed on the land track 3 adjacent to a region where the synchronization information SY in each synchronization frame of the record information is recorded. Moreover, one or two pre-pits 4 carrying the content of the pre-information to be recorded (address information and the like) are formed on the land track 3 adjacent to a front half portion within the synchronization frame other than the synchronization information SY. (In addition, there may be a case that the pre-pit 4 is not formed in the front half portion within the synchronization frame other than the synchronization information SY, depending on the content of the pre-information to be recorded).

At this time, in this embodiment, in one recording sector, the pre-pit 4 is formed only on an even-numbered synchronization frame (hereafter, referred to as an EVEN frame) or only on an odd-numbered synchronization frame (hereafter, referred to as an ODD frame), and then the pre-information is recorded. That is, in FIG. 2, if the pre-pit 4 is formed on the EVEN frame (indicated by the upward arrow on a solid line, in FIG. 2), the pre-pit 4 is not formed on the ODD frame before and after it.

Each pre-pit 4 is formed at a position corresponding to the wobbling of the groove track 2 as described later as shown in FIG. 2 in a form of a phase synchronization (i.e., at a convex portion of the waveform of the wobbling).

On the other hand, the groove track 2 is wobbled on all the synchronization frames at a standard wobbling frequency f0 of 145 kHz (i.e., the frequency at which one synchronization frame corresponds to 8 waves, and which corresponds to 186T). Then, a signal for the rotation control of a spindle motor is detected by detecting the wobbling signal having the standard wobbling frequency f0.

In addition, in the information recording apparatus of the present embodiment as described later, when detecting the pre-pit signal (i.e., a pre-pit signal Sgp described later), a gate signal corresponding to the timing at which the pre-pit 4 exists is obtained from the wobbling signal corresponding to the above mentioned wobbling synchronized with the pre-pit 4, the pre-pit signal is extracted from a pre-information signal Spp described later (which is detected in such a condition that the pre-pit signal is superimposed on the wobbling signal having the standard frequency) by using the gate signal, and the pre-information corresponding to it is obtained.

(II) Configuration and Operation of Information Recording Apparatus

Next, an embodiment of an information recording apparatus according to the present invention will be explained below with reference to FIG. 3 to FIG. 9.

The following explanation describes an embodiment in which the present invention is applied to an information recording apparatus for recording digital information sent from a host computer, onto the above mentioned DVD-R1.

Figure 3:
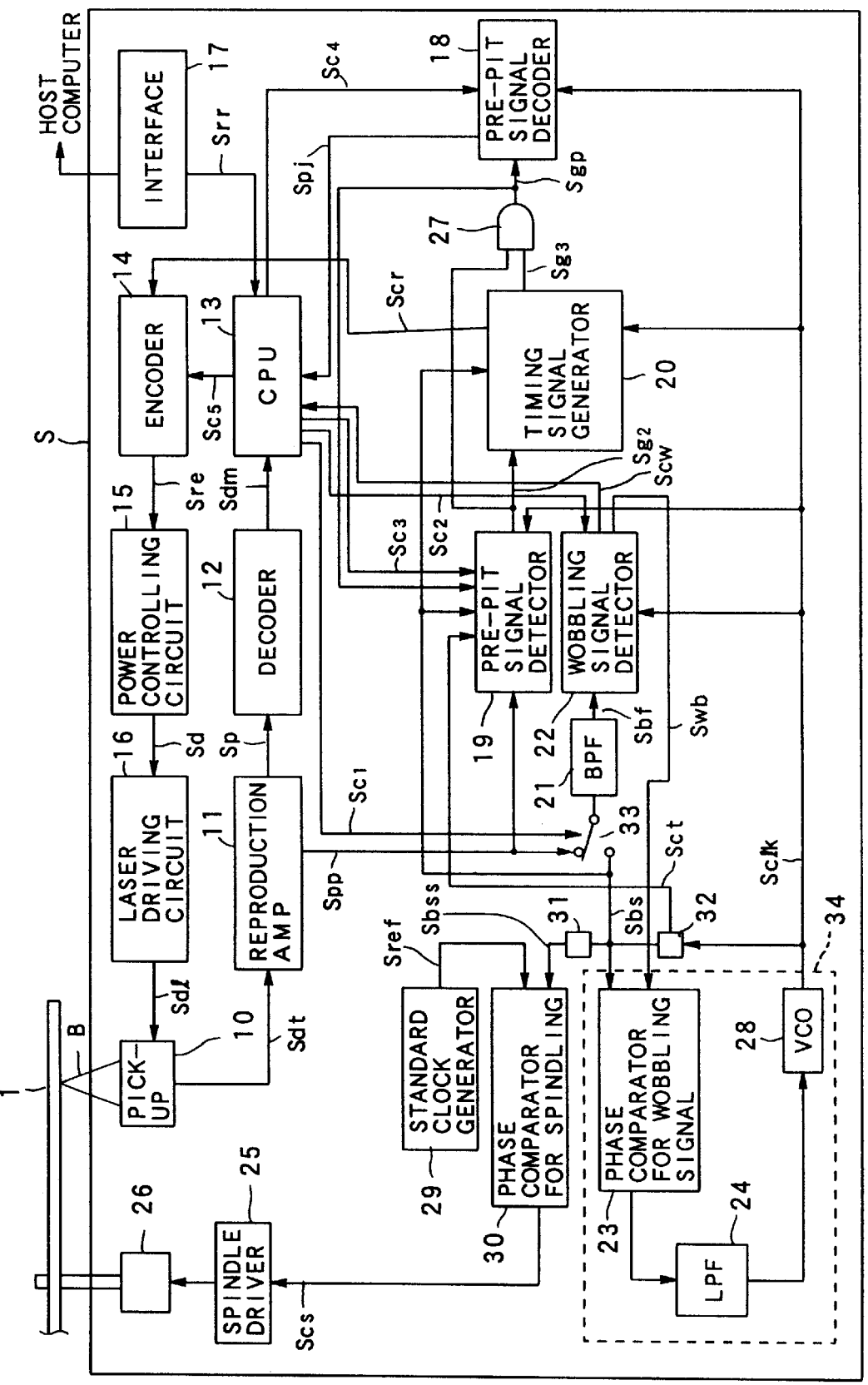
FIG. 3 is a block diagram showing a schematic configuration of an information recording apparatus of the embodiment.
Figure 4A:
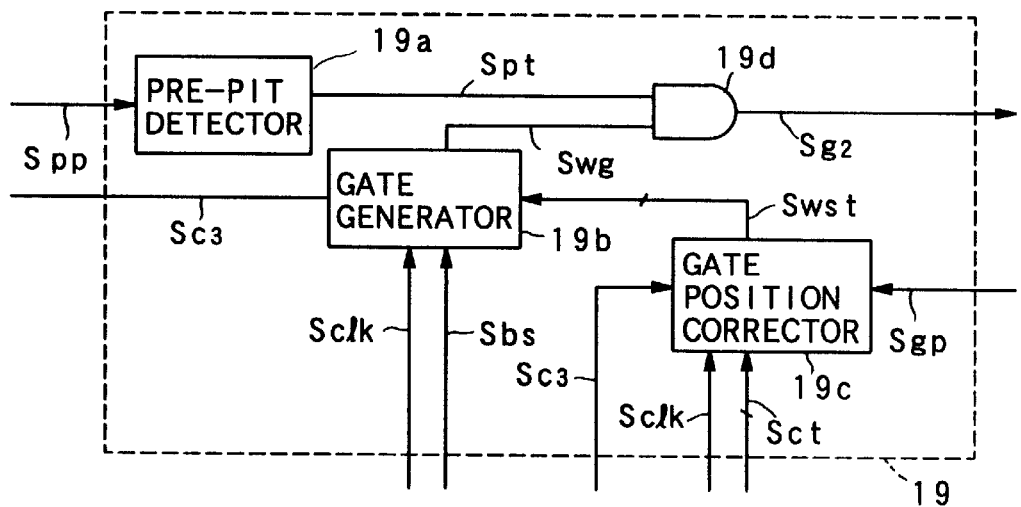
FIG. 4A is a block diagram showing a whole configuration of a pre-pit signal detector in the embodiment.
Figure 4B:
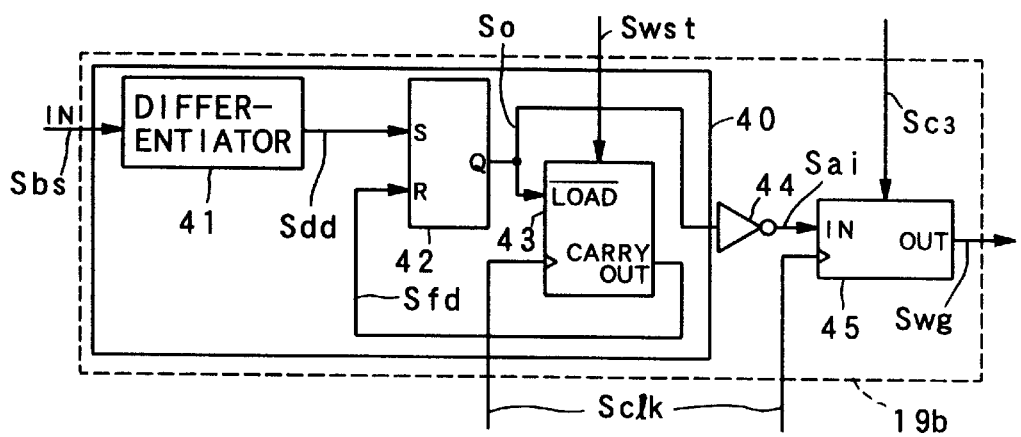
FIG. 4B is a block diagram showing a detailed configuration of a gate generator in the pre-pit signal detector in the embodiment.
Figure 4C:
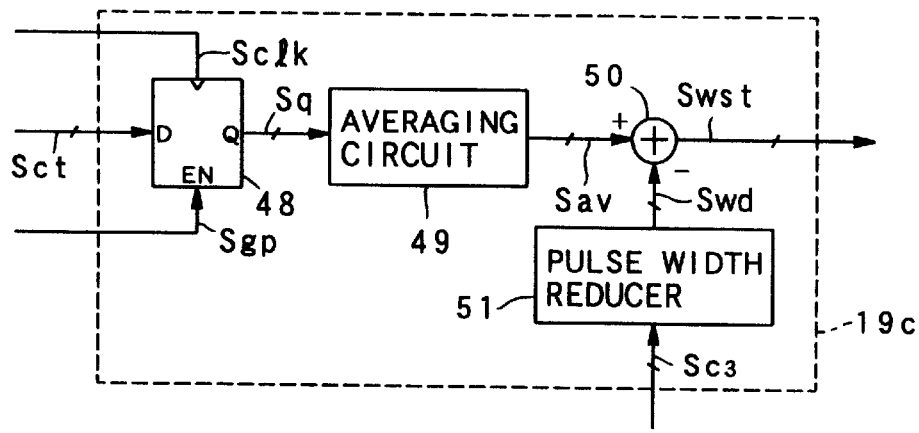
FIG. 4C is a block diagram showing a detailed configuration of a gate position corrector in the pre-pit signal detector in the embodiment.
Figure 5A:
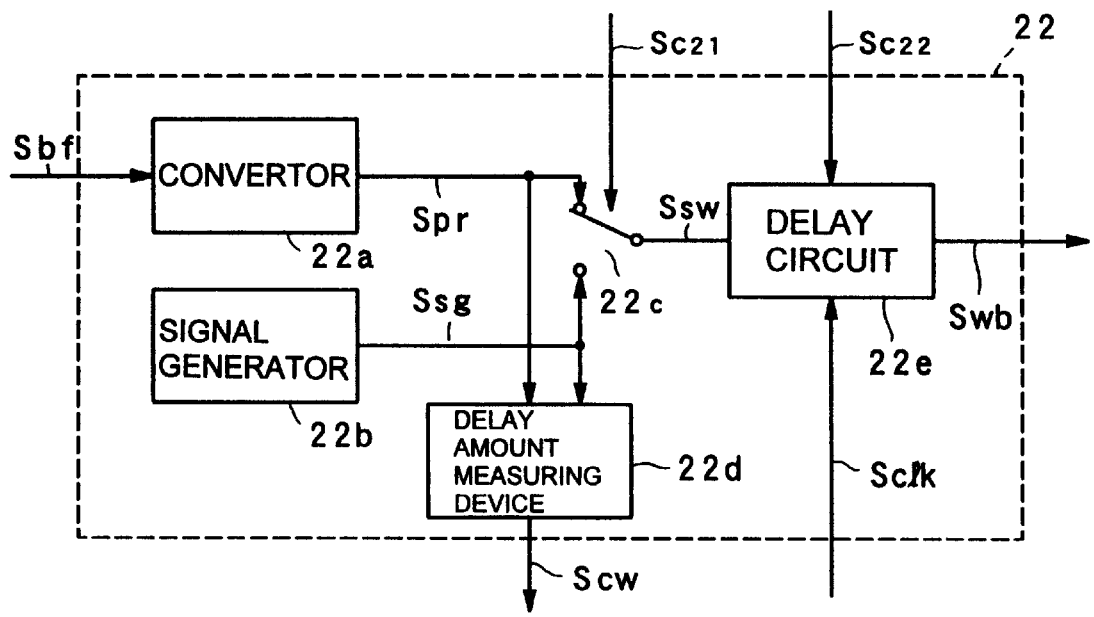
FIG. 5A is a block diagram showing a whole configuration of a wobbling signal detector in the embodiment.
Figure 5B:
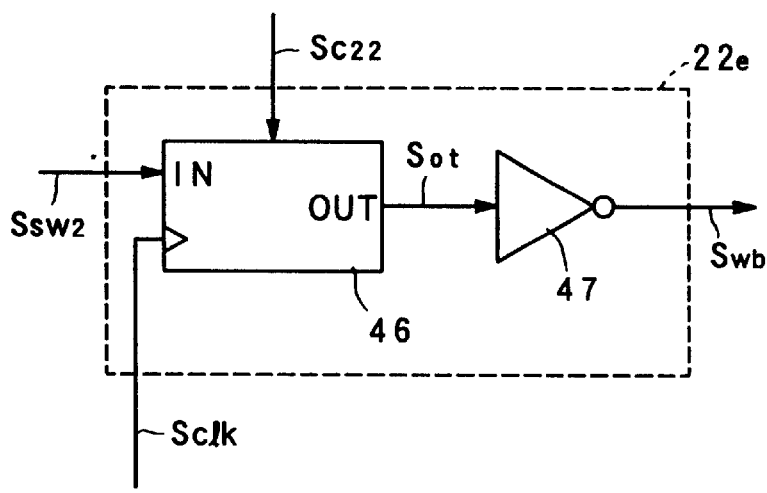
FIG. 5B is a block diagram showing a detailed configuration of a delay circuit in the wobbling signal detector in the embodiment.

FIG. 3 is a block diagram showing the whole configuration of the information recording apparatus in the embodiment. FIGS. 4A, 4B and 4C are block diagrams showing the configuration of a pre-pit detector. FIGS. 5A and 5B are block diagrams showing the configuration of a wobbling signal detector. FIGS. 6 to 9 are timing charts showing the operations in the respective portions of the information recording apparatus.

At first, the whole configuration and operation of the information recording apparatus according to this embodiment are described with reference to FIG. 3.

In the following embodiment, the pre-pit 4 including the address information on the DVD-R1 etc., and the wobbled groove track 2 are formed in advance on the DVD-R1. When recording the digital information, the pre-pit 4 is detected in advance to thereby obtain the address information etc., on the DVD-R1. By this, the record position on the DVD-R1, at which the digital information is to be recorded, is detected and the digital information is recorded thereat, and also a wobbling frequency of the groove track 2 is detected to thereby generate a record clock signal of managing the whole operation of the information recording apparatus and then record the record information.

As shown in FIG. 3, an information recording apparatus S of the embodiment is provided with an optical pickup 10, a reproduction amplifier 11, a decoder 12, a CPU 13 serving as an input controller, an encoder 14, a power controlling circuit 15, a laser driving circuit 16, a pre-pit signal decoder 18, a pre-pit signal detector 19 serving as a first detector, a timing signal generator 20, a BPF (Band Pass Filter) 21 serving as an extracting device and a filtering device, a wobbling signal detector 22 serving as a second detector, a spindle driver 25, a spindle motor 26, an AND circuit 27, a standard clock generator 29, a phase comparator for spindling 30, dividers 31 and 32, a switch 33, and a PLL (Phase Lock Loop) circuit 34 serving as a generator.

Also, the PLL circuit 34 is composed of a phase comparator for wobbling signal 23, an LPF (Low Pass Filter) 24 and a VCO (Voltage Controlled Oscillator) 28.

This information recording apparatus S receives digital information Srr to be recorded, from an external host computer through an interface 17, as described later.

Next, the whole operation will be described below.

The optical pickup 10 contains a laser diode, a polarization beam splitter, an objective lens, a light detector and the like (which are not shown). The optical pickup 10 irradiates a light beam B onto an information record surface of the DVD-R1 in accordance with a laser drive signal Sdl, detects the pre-pit 4 and the wobbling signal of the groove track 2 on the basis of a reflection light of the light beam B by using a radial push-pull method, and then records the digital information Srr to be recorded onto the information record surface. Also, in case that there already exists the recorded digital information, the optical pickup 10 detects the already recorded digital information on the basis of the reflection light of the light beam B.

The reproduction amplifier 11 amplifies a pickup detection signal Sdt including the information corresponding to the pre-pit 4 and the wobbling signal of the groove track 2 outputted by the optical pickup 10, and then outputs a pre-information signal Spp corresponding to the pre-pit 4 and the wobbling signal of the groove track 2, and further outputs an amplified signal Sp corresponding to the already recorded digital information.

After that, the decoder 12 performs an 8–16 demodulation and a de-interleave on the amplified signal Sp to thereby decode the amplified signal Sp, and then outputs a demodulation signal Sdm to the CPU 13.

On the other hand, the pre-pit signal detector 19 generates a pre-pit detection signal Sg2 by a later-described process, on the basis of the pre-information signal Spp, a count signal Sct and a division signal Sbs as described later from the divider 32, a control signal Sc3 from the CPU 13, a record clock signal Sclk from the PLL circuit 34 and a pre-pit signal Sgp from the AND circuit 27, and then outputs it to the timing signal generator 20 and one input terminal of and the AND circuit 27, respectively.

Here, the pre-pit detection signal Sg2 is a detection signal including only a component synchronous with a later-described wobbling signal, in the pre-information signal Spp, and includes both a pre-pit signal synchronous with the wobbling signal and a noise component synchronous with the wobbling signal (i.e., a noise component other than the pre-pit signal).

Then, on the basis of the pre-pit detection signal Sg2, the record clock signal Sclk and the division signal Sbs, the timing signal generator 20 generates a gate signal Sg3 indicating the timings of first three waves having the possibility that the pre-pit 4 is present in an 8-wave wobbling signal corresponding to one synchronization frame, and then outputs it to the other input terminal of the AND circuit 27.

In parallel with this, the timing signal generator 20 generates a synchronization signal Scr for encoding, which becomes a standard of a record timing in the encoder 14 as described later one the basis of the pre-pit detection signal Sg2, the record clock signal Sclk and the division signal Sbs, and then outputs it to the encoder 14.

The AND circuit 27 calculates a logical AND between the pre-pit detection signal Sg2 and the gate signal Sg3, and regards as the original pre-pit signal the portion corresponding to the first three waves in the 8-wave wobbling signal corresponding to the one synchronization frame from the component synchronous with the wobbling signal included in the pre-pit detection signal Sg2 (as mentioned above, the noise component synchronous with the wobbling signal is included in addition to the original pre-pit signal) to thereby extracts it, and further outputs it as the pre-pit signal Sgp to the pre-pit signal decoder 18 and the pre-pit signal detector 19.

Accordingly, the pre-pit signal decoder 18 decodes a content of the pre-pit 4 included in the pre-pit signal Sgp, on the basis of the record clock signal Sclk and a control signal Sc4 from the CPU 13, and then generates a pre-information decode signal Spj corresponding to the content, and further outputs it to the CPU 13.

On the other hand, one the basis of a control signal Sc1 from the CPU 13, the switch 33 selects the pre-information signal Spp when recording the record information to thereby outputs it to the BPF 21, and selects the division signal Sbs from the divider 32 when measuring a later-described delay amount to thereby outputs it to the BPF 21.

Accordingly, the BPF 21 extracts the wobbling signal component corresponding to the wobbling frequency (145 kHz) of the groove track 2, from either one of the pre-information signal Spp and the division signal Sbs, and then outputs it as a filter signal Sbf to the wobbling signal detector 22. Thus, the BPF 21 has a band pass characteristic with the wobbling frequency as a central frequency.

Next, the wobbling signal detector 22 has a comparator for comparing the wobbling signal component extracted by the BPF 21 with a predetermined standard value, as described later, and then generates an extraction wobbling signal Swb having a later-described pulse wave form, and further outputs it to the phase comparator for wobbling signal 23.

Accordingly, the phase comparator for wobbling signal 23, the LPF 24 and the VCO 28 in the PLL circuit 34 respectively detect a phase difference between the inputted extraction wobbling signal Swb and the division signal Sbs, and then extracts a predetermined low frequency component in the detected phase difference, and also generates the record clock signal Sclk while changing the frequency in accordance with a voltage value of the extracted low frequency component, and further outputs it to the wobbling signal detector 22, the pre-pit signal detector 19, the timing signal generator 20, the pre-pit signal decoder 18 and the divider 32.

Also, at the time of measuring the later-described delay amount other than the time of recording the information, the wobbling signal detector 22 generates a delay amount signal Scw indicating an amount of a phase delay occurring at a process of generating the record clock signal Sclk (actually, a phase delay occurring in the phase comparator for wobbling signal 23 in the PLL circuit 34 and the BPF 21), on the basis of the extracted wobbling signal Swb and the division signal Sbs when recording the information, and then outputs it to the CPU 13.

Then, the divider 32 having a function as a counter frequency-divides the record clock signal Sclk to the wobbling frequency (145 kHz), and then generates the division signal Sbs, and further outputs it to the phase comparator for wobbling signal 23, one terminal of the switch 33, the divider 31, the pre-pit signal detector 19 and the timing signal generator 20, respectively.

In parallel with this, the divider 32 counts the number of pulses of the inputted record clock signal Sclk while it is reset for each timing when the division signal Sbs is shifted from "LOW" to "HIGH", and then outputs the counted value as a count signal Sct to the pre-pit signal detector 19.

Then, the divider 31 further frequency-divides the division signal Sbs to about several kHz, and then outputs it as a division signal Sbss to the phase comparator for spindling 30.

Accordingly, the phase comparator for spindling 30 compares phase of the inputted division signal Sbss with that of a standard clock signal Sref including a standard frequency component of a rotation speed of the DVD-R1 sent by the standard clock generator 29, and then sends a difference signal thereof as a rotation control signal Scs through the spindle driver 25 to the spindle motor 26. As a result, a spindle servo control is performed on the spindle motor 26, so that the DVD-R1 is rotated at a rotation speed based on a frequency and a phase of the standard clock signal Sref.

On the other hand, the interface 17 performs on a digital information Srr sent from the host computer (not shown) an interface operation of inputting the digital information Srr to the information recording apparatus S, and then outputs the digital information Srr after the interface process, through the CPU 13 to the encoder 14.

Accordingly, the encoder 14 carries out an ECC generating process, an 8–16 modulation and a scrambling process (which are not shown) with the encoding synchronization signal Scr from the timing signal generator 20 as a timing signal, and then generates a modulation signal Sre, and further outputs it to the power controlling circuit 15.

After that, in order to excellently improve a shape of a record pit formed on the DVD-R1, the power controlling circuit 15 performs a wave form conversion (a so-called write strategy process) on the modulation signal Sre, in accordance with the record clock signal Sclk, and then outputs it as a record signal Sd of driving the laser diode (not shown) within the optical pickup 10.

Moreover, in accordance with the record signal Sdl, the laser driving circuit 16 outputs the laser drive signal Sdl to actually drive the laser diode and thereby make the laser diode irradiating the light beam B.

Finally, the CPU 13 controls the operations of the above-mentioned respective elements by using the respective control signals Sc1 to Sc4, and also obtains the pre-information on the basis of the pre-information decode signal Spj outputted by the pre-pit signal decoder 18. The CPU 13 further controls the operation of recording the digital information Srr on the DVD-R1 at the position corresponding to the address information included in the pre-information, by using a control signal Sc5.

In parallel with this, in accordance with the demodulation signal Sdm, the CPU 13 outputs a reproduction signal corresponding to the already recorded digital information through the interface 17 to the external device, and also controls the information recording apparatus S as a whole.

Moreover, in accordance with the delay amount signal Scw outputted by the wobbling signal detector 22 when measuring the delay amount, the CPU 13 generates a later-described delay amount signal Sc22 of setting a delay amount in a later-described delay circuit 22e when recording the information, and then outputs it as a part of the control signal Sc2 to the wobbling signal detector 22 when recording the information.

Next, the configuration and the schematic operation of the pre-pit signal detector 19 according to the present invention will be described below with reference to FIG. 4.

FIG. 4A is a block diagram showing the whole configuration of the pre-pit signal detector 19, FIG. 4B is a block diagram showing the detailed configuration of the gate generator 19b in the pre-pit signal detector 19, and FIG. 4C is a block diagram showing the detailed configuration of the gate position corrector 19c in the pre-pit signal detector 19.

As shown in FIG. 4A, the pre-pit signal detector 19 is composed of a pre-pit detector 19a, a gate generator 19b serving as a generating device, a gate position corrector 19c serving as a phase difference detecting device and an AND circuit 19d.

As shown in FIG. 4B, the gate generator 19b is composed of digital one shot circuits 40 and 45 and an inverter 44. Moreover, each of the digital one shot circuits 40 and 45 is composed of a differentiator 41, a flip-flop circuit 42 and a down counter 43.

As shown in FIG. 4C, the gate position corrector 19c is composed of a flip-flop circuit 48, an averaging circuit 49, an adder 50 and a pulse width reducer 51.

Next, the schematic operation of the pre-pit signal detector 19 is explained.

At first, the pre-pit detector 19a compares the amplified pre-information signal Spp with a threshold pre-set to detect the pre-pit signal which is superimposed on and included in the wobbling signal within the pre-information signal Spp, and then outputs a component having a higher value than the threshold, as a pre-pit detection signal Spt, to one input terminal of the AND circuit 19d.

On the other hand, the gate position corrector 19c uses (i) the information indicative of a gate width (namely, a gate width in a gate signal to finally detect the pre-pit signal Sgp) pre-set to generate the pre-pit detection signal Sg2 included in the control signal Sc3 from the CPU 13, (ii) the record clock signal Sclk, (iii) the count signal Sct from the divider 32 and (iv) the pre-pit signal Sgp from the AND circuit 27, and thereby generates a gate start signal Swst indicative of a rising timing of a gate (actually, indicative of a time duration from a rising timing of each pulse in the division signal Sbs to a rising timing of the gate) in a later-described gate signal Swg (a gate signal Swg accurately synchronous with the wobbling signal) to generate the pre-pit detection signal Sg2 by a later-described process. The gate position corrector 19c outputs the generated gate start signal Swst to the gate generator 19b.

At this time, as shown in FIG. 4C with regard to the actual operation of the gate position corrector 19c, the flip-flop circuit 48 latches a count value of the count signal Sct inputted at that time for each timing when the record clock signal Sclk is changed to "HIGH", only in the time duration while the pre-pit signal Sgp is at "HIGH", and then outputs this latched count value as a latch signal Sq to the averaging circuit 49. In this case, if the pre-pit signal Sgp is changed from "HIGH" to "LOW", the flip-flop circuit 48 outputs the count value of the count signal Sct inputted immediately before this change, as the latch signal Sq, to the averaging circuit 49.

This latch signal Sq includes a count value indicative of a time duration from a rising timing in each pulse of the division signal Sbs synchronous with the wobbling signal to a rising timing of the actually-detected pre-pit signal Sgp, as described later.

Then, the averaging circuit 49 adds the count value inputted as the latch signal Sq only for a predetermined time duration and divides this added value by the predetermined time duration to accordingly average it, and then generates an averaged signal Sav having a value in which the above-mentioned time duration from the rising timing in the respective pulses of the division signal Sbs to the rising timing of the pre-pit signal Sgp is averaged for a plurality of times, and further outputs it to one input terminal of the adder 50.

In parallel with this, the pulse width reducer 51 reduces a value of a gate width included in the control signal Sc3 by half, and then generates a gate width signal Swd indicative of the reduced gate width, and further inverts it and outputs it to the other input terminal of the adder 50.

Accordingly, the adder 50 adds the averaged signal Sav and the inversion signal of the gate width signal Swd, and then generates the gate start signal Swst, and further outputs it to the gate generator 19b.

By this operation of the adder 50, the gate start signal Swst includes information indicative of the time duration in which the value indicative of the gate width equal to half of the gate width included in the control signal Sc3 is subtracted from the averaged time duration, in which the time duration from the rising timing in each pulse of the division signal Sbs to the rising timing of the pre-pit signal Sgp is averaged for a plurality of times. That is, this information indicates a rising timing (actually, the time duration from the rising timing of the corresponding pulse in the division signal Sbs to the rising timing of the gate signal) of the gate signal (i.e., the later-described gate signal Swg generated by the gate generator 19b), the pulse width of which is a gate width included in the control signal Sc3, and which is centered on the timing of the pre-pit signal Sgp that appears more definitive by the averaging operation.

Then, the gate generator 19b uses (i) the information indicative of the gate width pre-set to generate the pre-pit detection signal Sg2 included in the control signal Sc3, (ii) the record clock signal Sclk, (iii) the division signal Sbs and (iv) the gate start signal Swst, and thereby generates the gate signal Swg, which is changed from "LOW" to "HIGH" after the elapse of only the time duration indicated by the gate start signal Swst from the timing when each pulse in the division signal Sbs is changed to "HIGH" and also has the gate width included in the control signal Sc3, by a later-described process. Then, the gate generator 19b outputs the generated gate signal Swg to the other input terminal of the AND circuit 19d.

At this time, as shown in FIG. 4B with regard to the actual operation of the gate generator 19b, the digital one shot circuit 40 outputs to the inverter 44 an output signal So, which is changed from "LOW" to "HIGH" at the rising timing of the inputted division signal Sbs and then changed from "HIGH" to "LOW" after the elapse of the time duration indicated by the gate start signal Swst.

Then, the inverter 44 inverts the output signal So from the digital one shot circuit 40, and outputs it as an inversion signal Soi to the digital one shot circuit 45.

The digital one shot circuit 45 generates the gate signal Swg, which is changed from "LOW" to "HIGH" at a timing when the inversion signal Soi is changed from "LOW" to "HIGH" and which is then changed from "HIGH" to "LOW" after the elapse of the time duration indicated by the information indicative of the gate width to generate the pre-pit detection signal Sg2 included in the control signal Sc3, by the operation similarly to that of the digital one shot circuit 40. Then, the digital one shot circuit 45 outputs the generated gate signal Swg to the other input terminal of the AND circuit 19d.

Next, the operations of the respective elements constituting the digital one shot circuit 40 are explained. At first, the differentiator 41 detects the rising timing of each pulse in the division signal Sbs, and then generates a rising signal Sdd, and further outputs it to a set terminal of the flip-flop circuit 42.

Then, the flip-flop circuit 42 generates an output signal So, which is changed to "HIGH" at a timing when the rising signal Sdd is changed from "LOW" to "HIGH", and then outputs the output signal So to a load terminal of the down counter 43 and the inverter 44.

Then, the down counter 43 starts a subtraction count of the number of pulses of the record clock signal Sclk, which corresponds to the time duration indicated by the gate start signal Swst from the timing when the output signal So is inputted, and then generates an output signal Sfd at a timing when the count value becomes 0, and further outputs it to a reset terminal of the flip-flop circuit 42.

Accordingly, the flip-flop circuit 42 changes the output signal So, which has been at "HIGH" until this time, to "LOW". After that, it continues to output the "LOW" signal, as the output signal So until an input of a pulse of a next division signal Sbs, to the inverter 44 and the down counter 43.

This operation allows the generation of the output signal So, which is changed to "HIGH" at a timing when the division signal Sbs is changed to "HIGH" and which is again changed to "LOW" after the elapse of the time duration indicated by the gate start signal Swst.

Then, the AND circuit 19d calculates a logical AND of the pre-pit detection signal Spt and the gate signal Swg, and then generates the pre-pit detection signal Sg2, and further outputs it to one input terminal of the AND circuit 27 and the timing signal generator 20.

Here, the pre-pit detection signal Sg2 is the logical AND of the pre-pit detection signal Spt and the gate signal Swg (i.e., the signal having the phase accurately synchronous with the wobbling signal) as mentioned above. As a result, it is the detection signal, which includes only the component synchronous with the wobbling signal in the pre-information signal Spp, namely, the signal including both of the pre-pit signal synchronous with the wobbling signal and the noise component synchronous with the wobbling signal.

Next, the configuration and the schematic operation of the wobbling signal detector 22 according to the present invention is explained with reference to FIG. 5.

FIG. 5A is a block diagram showing the whole configuration of the wobbling signal detector 22, and FIG. 5B is a block diagram showing the detailed configuration of the delay circuit 22e in the wobbling signal detector 22.

As shown in FIG. 5A, the wobbling signal detector 22 is composed of a comparator 22a, a signal generator 22b, a switch 22c, a delay amount measuring device 22d serving as a phase difference detector, and a delay circuit 22e serving as a detector and a phase controller.

As shown in FIG. 5B, the delay circuit 46 is composed of a digital one shot circuit 46 having the configuration similar to that of the digital one shot circuit 40 or 45 shown in FIG. 4B, and an inverter 47.

Next, the schematic operation of the wobbling signal detector 22 is explained.

At first, when recording the information, the comparator 22a compares the filter signal Sbf outputted from the BPF 21 (which includes the wobbling signal component corresponding to the wobbling frequency of the groove track 2, as mentioned above) with the predetermined threshold, and converts it into a binary value, to thereby generate a binary signal Spr and output it to one input terminal of the switch 22c.

On the other hand, when measuring the delay amount as described later, the signal generator 22b generates a standard signal Ssg, which is a pulse signal having a frequency corresponding to the wobbling frequency of the groove track 2, and then outputs it to the other input terminal of the switch 22c and the delay amount measuring device 22d.

In accordance with a control signal Sc21 included in the control signal Sc2 from the CPU 13, the switch 22c outputs the binary signal Spr as a switch signal Ssw to the delay circuit 22e when recording the information, and outputs the standard signal Ssg as the switch signal Ssw to the delay circuit 22e when measuring the delay amount.

Accordingly, the delay circuit 22e delays the switch signal Ssw by a time duration corresponding to a delay amount signal Sc22 included in the control signal Sc2, in accordance with the record clock signal Sclk to thereby generate the extraction wobbling signal Swb and output it to the phase comparator for wobbling signal 23.

At this time, as shown in FIG. 5B with regard to the actual operation of the delay circuit 22e, the digital one shot circuit 46 outputs to the inverter 47 an output signal Sot, which is changed from "LOW" to "HIGH" at a rising timing of the inputted switch signal Ssw and is then changed from "HIGH" to "LOW" after the elapse of the time corresponding to the delay amount signal Sc22, similarly to the digital one shot circuit 40 or 45.

Then, the inverter 47 inverts the output signal Sot from the digital one shot circuit 46, and outputs it as the extraction wobbling signal Swb to the phase comparator for wobbling signal 23.

This operation of the delay circuit 22e allows the generation of the extraction wobbling signal Swb, which is changed from "HIGH" to "LOW" when the switch signal Ssw is changed to "HIGH", and which is also changed from "LOW" to "HIGH" after the elapse of the time corresponding to the delay amount signal Sc22.

In addition, the extraction wobbling signal Swb has a rising timing in expectation of a phase delay occurring in the PLL circuit 34 as described later, and a duty ratio thereof is not always 50%.

On the other hand, when measuring the delay amount, the delay amount measuring device 22d compares a phase of the standard signal Ssg with that of the binary signal Spr, which is generated by passing the standard signal Ssg around the PLL circuit 34 and the BPF 21, and outputs a difference between these phases to the CPU 13 as the delay amount signal Scw indicative of the phase delay amount in the information recording apparatus S (especially, the BPF 21 and the PLL circuit 34).

(III) Operation of Invention

The whole operation according to the present invention among the operations of the above-mentioned information recording apparatus S will be described below with reference to FIGS. 6 to 9.

At first, a compensation operation for a phase delay according to the present invention is described with reference to FIGS. 6 and 7.

In the compensation operation, the CPU 13 firstly uses the control signal Sc1 to switch the switch 33 to the side of the division signal Sbs, at a timing other than the time of recording the information (for example, when a power supply of the information recording apparatus S is turned on, or for each predetermined time duration during idling), and also uses the control signal Sc21 to switch the switch 22c to the side of the standard signal Ssg.

Figure 6:
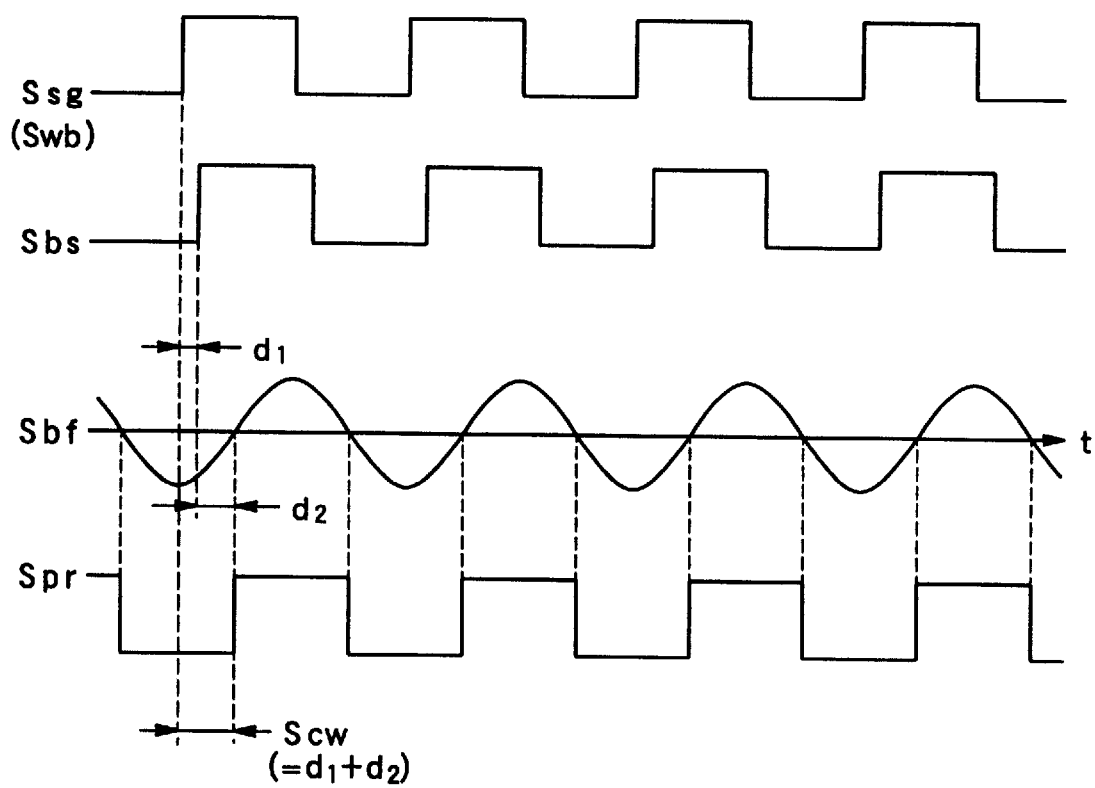
FIG. 6 is a timing chart (I) showing an operation of the information recording apparatus in the embodiment.

In this condition, the signal generator 22b generates the standard signal Ssg shown at a top stage of FIG. 6, and then outputs it to the delay amount measuring device 22d and the delay circuit 22e.

The delay amount measuring device 22d tentatively stores the phase of the inputted standard signal Ssg.

On the other hand, in the delay circuit 22e, the delay amount included in the delay amount signal Sc22 from the CPU 13 is set to 0. Thus, the delay circuit 22e does not change the phase of the switch signal Ssw as the standard signal Ssg, and then outputs it as the extraction wobbling signal Swb to the PLL circuit 34 while maintaining its original state.

Then the PLL circuit 34 and the divider 32 perform the operation of generating and dividing the record clock signal Sclk, in accordance with the extraction wobbling signal Swb, and then generate a division signal Sbs shown at a second stage from the top of FIG. 6.

At this time, in the phase comparator for wobbling signal 23 in the PLL circuit 34, an offset thereof and the like generates a phase delay d1 shown in FIG. 6 (this phase delay d1 is generated when the information is actually recorded).

Next, when the division signal Sbs is inputted through the switch 33 to the BPF 21, the BPF 21 carries out the filtering process with the wobbling frequency as a central frequency thereof to thereby generate a filter signal Sbf shown at a second stage from the bottom of FIG. 6.

Here, a phase delay d2 shown in FIG. 6 is also generated in the BPF 21 (this phase delay d2 is also generated when the information is actually recorded).

The filter signal Sbf is converted into a binary value by the comparator 22a, and is then outputted to the delay amount measuring device 22d as a binary signal Spr shown at a bottom stage of FIG. 6 (at this time, the switch 22c is switched in advance to the side of the binary signal Spr by the control signal Sc21).

Accordingly, the delay amount measuring device 22d compares a phase of the pre-stored standard signal Ssg with that of the binary signal Spr, and then outputs the phase difference "d1+d2" to the CPU 13 as the delay amount signal Scw indicative of the phase delay amount in the information recording apparatus S.

Next, the compensation operation for the phase delay when the information is actually recorded is explained with reference to FIG. 7.

At first, when recording the information, the CPU 13 uses the control signal Sc1 to switch the switch 33 to the side of the pre-information signal Spp, and also uses the control signal Sc2 to switch the switch 22c to the side of the binary signal Spr.

Figure 7:
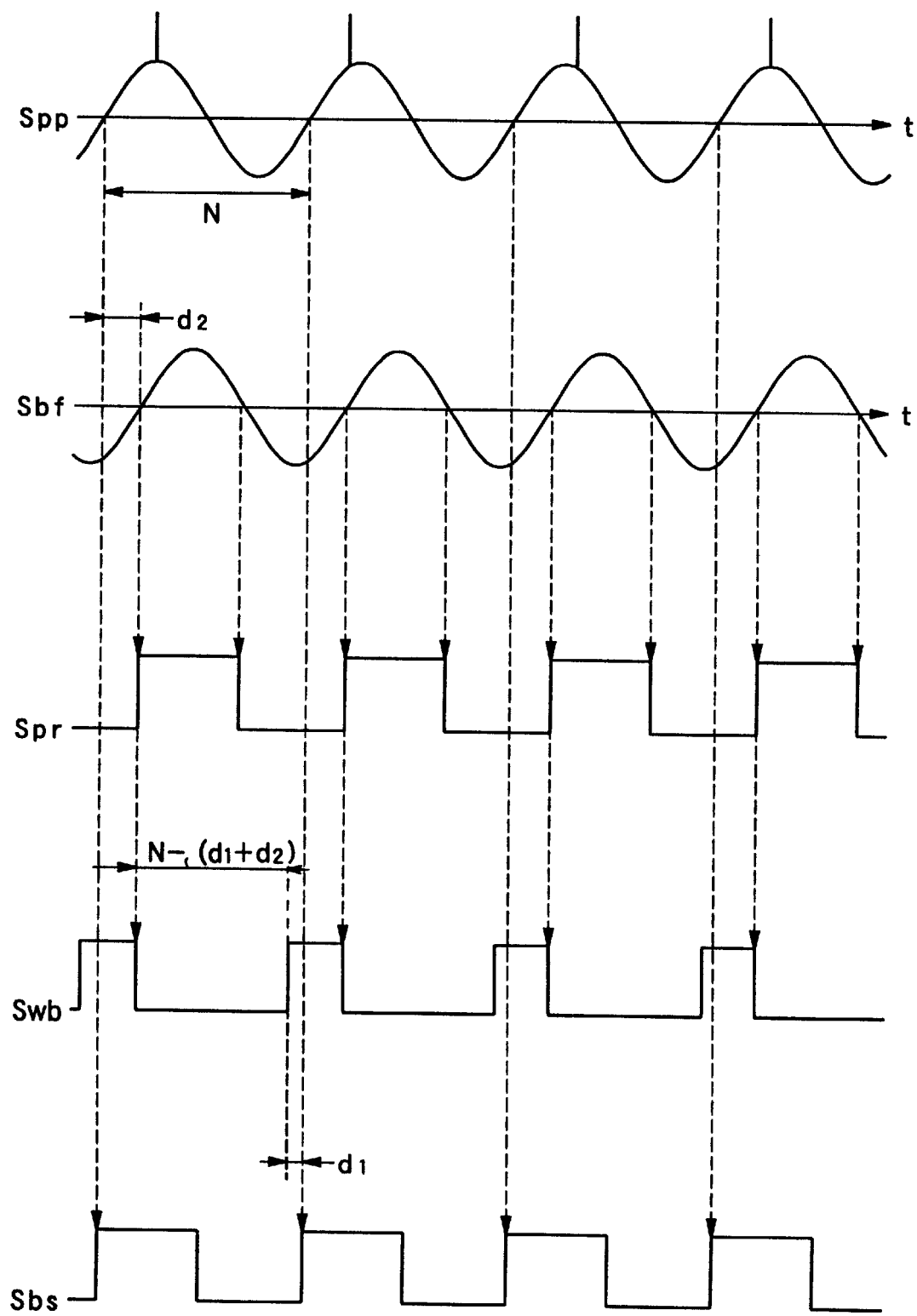
FIG. 7 is a timing chart (II) showing an operation of the information recording apparatus in the embodiment.

When in this condition the pre-information signal Spp (this is a cyclic signal, and the cycle thereof is assumed to be "N" as shown in FIG. 7) shown at a top stage of FIG. 7 is inputted from the reproduction amplifier 11 through the switch 33 to the BPF 21, the BPF 21 extracts a component synchronous with the wobbling frequency in the pre-information signal Spp, and then generates a filter signal Sbf shown at a second stage from the top of FIG. 7.

At this time, the phase delay d2 is superimposed on the filter signal Sbf.

When the filter signal Sbf is inputted to the wobbling signal detector 22, the comparator 22a generates a binary signal Spr shown at a third stage from the top of FIG. 7, and outputs it to the delay circuit 22e.

Then, the delay circuit 22e gives a phase delay, which corresponds to the phase delay amount indicated by the delay amount signal Sc22 from the CPU 13, to a rising timing of the binary signal Spr, which is the cyclic signal. Accordingly, an extraction wobbling signal Swb shown,at a second stage from a bottom of FIG. 7 is generated.

Here, the phase delay amount indicated by the delay amount signal Sc22 is "N−(d1+d2)" as shown in FIG. 7, on the basis of the delay amount signal Scw outputted to the CPU 13 when measuring the delay amount.

In addition, there may be a case that a duty ratio of the extraction wobbling signal Swb is not 50%, depending on the above-mentioned operation of the delay circuit 22e.

The input of the extraction wobbling signal Swb to the PLL circuit 34 allows the record clock signal Sclk to be generated, and also allows the division signal Sbs to be generated by the divider 32.

At this time, the phase delay d1 is superimposed in the PLL 25 circuit 34. However, the phase delay "N−(d1+d2)" is superimposed in advance on the extraction wobbling signal Swb by the delay circuit 22e. Thus, although the phase of each pulse in the division signal Sbs outputted by the divider 32 has the respective phase delays in the respective BPF 21 and the PLL circuit 34, it accurately agrees with a phase in the pre-information signal Spp, as shown at the bottom stage of FIG. 7.

In addition, the duty ratio is corrected such that, at the stages of the record clock signal Sclk and the division signal Sbs, they are respectively 50%, by the operation of the VCO 28.

Next, the operation of generating the pre-pit signal Sgp according to the present invention will be described below with reference to FIGS. 8 and 9.

Figure 8:
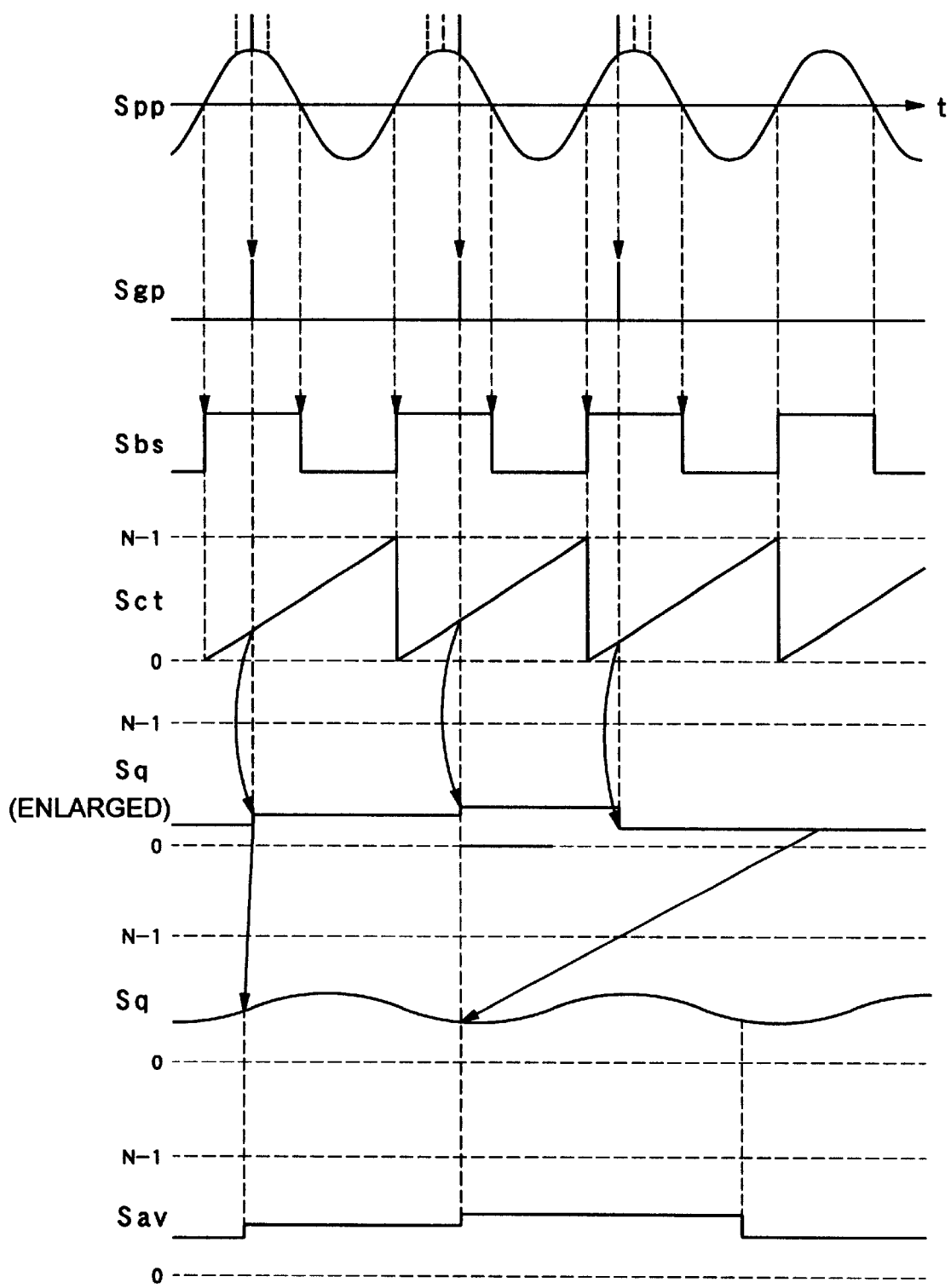
FIG. 8 is a timing chart (III) showing an operation of the information recording apparatus in the embodiment.

At first, it is assumed that the above-mentioned operations allow the pre-information signal Spp shown at a top stage of FIG. 8 to be outputted by the reproduction amplifier 11.

Here, a wobbling cycle and a detecting cycle of the pre-pit 4 are supposed to agree with each other, in the pre-information signal Spp. However, there may be a case that the cycles do not agree with each other because of a so-called cross talk from a wobbling signal corresponding to an adjacent groove track 2.

That is, there may be a case that the pre-pit signal is detected at a timing indicated by dashed lines before and after a center of a maximum amplitude portion in the pre-information signal Spp (a solid line implies a timing when the pre-pit signal is actually detected), as shown at a top stage of FIG. 8.

Thus, when the pre-pit signal Sgp is generated by the above-mentioned operations in accordance with the pre-information signal Spp shown at the top stage of FIG. 8, a wave form thereof is as shown at a second stage from the top of FIG. 8.

Therefore, in the present invention, the following process is carried out in order to extract the pre-pit signal Sgp from the pre-information signal Spp by using a gate signal Swg having a narrow width (namely, unnecessary noise is rarely detected), even if the pre-pit signal Sgp is located before and after the wobbling signal as mentioned above on a time axis.

That is, at first, in the flip-flop 48 in the gate position corrector 19c, the counting operation is started at a rising timing of a pulse in the division signal Sbs shown at a third stage from the top of FIG. 8 (which accurately agrees with the wobbling cycle in the pre-information signal Spp by the operations shown in FIGS. 6 and 7), and then a count signal Sct to be reset at a pulse of a next division signal Sbs (a count signal Sct generated by the divider 32 as shown at a fourth stage from the top of FIG. 8) is latched at a timing of the pre-pit signal Sgp, to thereby generates a latch signal Sp (shown at a third stage from a bottom of FIG. 8) indicative of each value.

Coefficient values indicated by this latch signal Sq are averaged by the averaging circuit 49 for each predetermined time duration (refer to a second stage from the bottom of FIG. 8), as mentioned above. Accordingly the above-mentioned averaged signal Sav is generated as shown at the bottom stage of FIG. 8.

Figure 9:
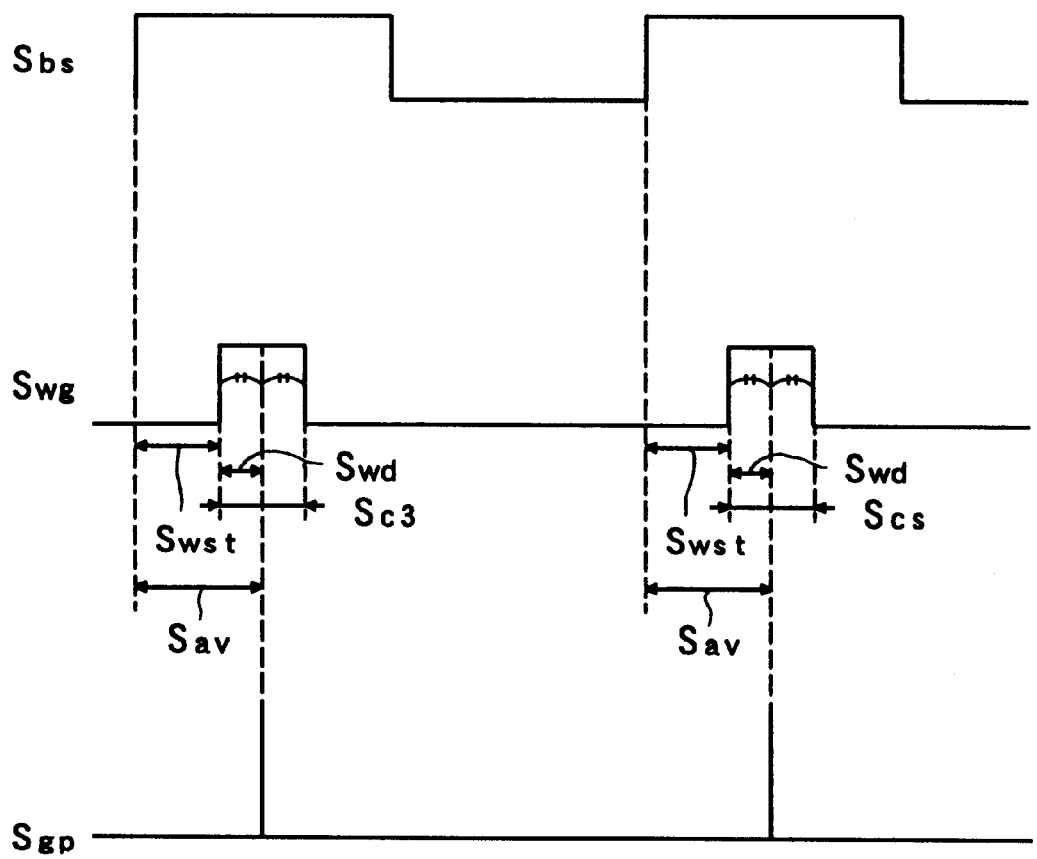
FIG. 9 is a timing chart (IV) showing an operation of the information recording apparatus in the embodiment.

At this time, the averaged signal Sav has the value in which the time duration from the rising timing in each pulse of the division signal Sbs to the rising timing of the pre-pit signal Sgp is averaged for a plurality of times (refer to a top stage and a second stage from the top of FIG. 9).

Then, the adder 50 subtracts a gate width signal Swd (refer to the second stage from the top of FIG. 9) indicative of a gate width, in which the value of the gate width included in the control signal Sc3 is reduced by half, from the averaged signal Sav to thereby generate the gate start signal Swst indicative of a time duration shown at the second stage from the top of FIG. 9.

By this operation, the gate start signal Swst includes information indicative of the rising timing of a gate signal Swg, the pulse width of which is a gate width included in the control signal Sc3, and which is centered on the timing of the pre-pit signal Sgp that appears more definitive by the averaging operation.

Then, the gate generator 19b generates a gate signal Swg (refer to the second stage from the top of FIG. 9) which is changed from "LOW" to "HIGH" after the elapse of only the time duration indicated by the gate start signal Swst from the timing when each pulse in the division signal Sbs is changed to "HIGH", by the operations of the digital one shot circuits 40 and 45 and the inverter 44, and also has the gate width included in the control signal Sc3.

After that, the operations of the AND circuit 19d, the timing signal generator 20 and the AND circuit 27 enable the pre-pit signal Sgp (refer to a bottom stage of FIG. 9) corresponding to the pre-pit 4 to be further accurately detected, even if the gate width included in the control signal Sc3 is made narrower.

As mentioned above, according to the operations of the information recording apparatus S of the embodiment, the phase difference which may be induced in the BPF 21 and the PLL circuit 34 are detected in advance. Then, while it is canceled, the actual pre-pit signal Sgp is detected, which enables the pre-pit signal Sgp to be accurately detected.

Also, the phase of the filter signal Sbf is controlled so as to cancel the detected phase difference, and is outputted to the gate generator 19b. Thus, it is possible to surely cancel the phase difference.

Moreover, the phase differences between the pre-pit signal Sgp and the wobbling signal included in the detected pre-information signal Spp are averaged, and the gate signal Swg for detecting the pre-pit signal Sgp is generated on the basis of the averaged value. Thus, this enables the generation of the gate signal Swg in response to the timing of the occurrence of the pre-pit signal Sgp, and thereby enables the pre-pit signal Sgp to be accurately detected.

Also, the gate signal Swg is generated such that the averaged value of the phase differences between the pre-pit signal Sgp and the wobbling signal agrees with a central timing of the gate signal Swg. Thus, the probability that the timing when the pre-pit signal Sgp is generated and the central timing of the gate signal Swg agree with each other is made higher, which thereby enables the pre-pit signal Sgp to be surely detected even if the pulse width of the gate signal Swg is made narrower.

Thus, even if the temperature characteristic of the above-mentioned respective constitutional elements and the like may cause the phase performance to be varied (even if the phase relation is apparently deviated between the pre-pit signal Sgp and the wobbling signal), the gate signal Swg can be generated with the timing of the generation of the pre-pit signal Sgp as the center. Hence, it is possible to reduce the detection leakage of the pre-pit signal Sgp.

Furthermore, the pre-pit signal Sgp can be further accurately detected, the pre-information can be further accurately obtained to accurately record the record information.

In addition, in the above-mentioned embodiment, the case is described in which the present invention is applied to the DVD-R 1 that is the WO-type optical disk. However, the present invention can be applied to a re-writable type optical disk, such as DVD-R/W and the like, in which so-called phase change material and the like are used as a record layer thereof.

Moreover, in the above-mentioned embodiment, the case is described in which the present invention is applied to the DVD-R 1. However, it is not limited to this case. So, the present invention can be widely applied to a case that predetermined digital information is recorded on a record medium (for example, a record medium in a form of tape, and the like) in which information for the record control is recorded through a pre-pit and a wobbling of a track.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No.10-249775 filed on Sep. 3, 1998 including the specification, claims, drawings and summary is incorporated herein by reference in its entirety.

What is claimed is:

1. A pre-pit signal detecting apparatus, which is used in an information recording apparatus for recording record information onto a record medium on which record control information for controlling a recording operation of said information recording apparatus is recorded in advance by forming a pre-pit on said record medium, for detecting a pre-pit signal corresponding to the pre-pit when said information recording apparatus records the record information onto said record medium, said pre-pit signal detecting apparatus comprising:

an extracting device, to which a reproduction signal of said record medium is inputted, for extracting and outputting a predetermined signal component, which is used for detecting the pre-pit signal, out of the inputted reproduction signal;

an input controlling device for inputting a standard signal, which is set in advance, to said extracting device in place of the reproduction signal before the pre-pit signal is detected and inputting the reproduction signal to said extracting device when the pre-pit signal is detected;

a phase difference detecting device for comparing the standard signal outputted by said extracting device with the standard signal inputted by said input controlling device, and for detecting a phase difference generated between the compared standard signals due to an extracting operation of said extracting device before the pre-pit signal is detected; and a pre-pit detecting device for detecting the pre-pit signal on the basis of the extracted predetermined signal component while canceling the detected phase difference.

2. A pre-pit signal detecting apparatus according to claim 1, wherein said extracting device comprises:

a filtering device for extracting a partial signal including the pre-pit signal from the reproduction signal, which is generated in response to a reflection light of a recording light beam irradiated onto said record medium; and a gate signal generating device for generating a gate signal to extract the pre-pit signal from the extracted partial signal.

3. A pre-pit signal detecting apparatus according to claim 2, wherein said pre-pit detecting device comprises a phase controlling device for controlling a phase of the extracted partial signal so as to cancel the detected phase difference and then outputting it to said gate signal generating device.

4. A pre-pit signal detecting apparatus, which is used in an information recording apparatus for recording record information onto a record medium on which record control information for controlling a recording operation of said information recording apparatus is recorded in advance by forming a pre-pit and a wobbling track having a phase corresponding to the pre-pit on said record medium, for detecting a pre-pit signal corresponding to the pre-pit from a reproduction signal corresponding to a reflection light of a recording light beam irradiated onto said record medium when said information recording apparatus records the record information onto said record medium, said pre-pit signal detecting apparatus comprising:

a first detecting device for detecting the pre-pit signal corresponding to a plurality of pre-pits on the basis of a gate signal to extract the pre-pit signal from the reproduction signal;

a second detecting device for detecting a wobbling signal corresponding to a wobble of the wobbling track;

a phase difference detecting device for detecting a phase difference between (i) the wobbling signal corresponding to the detected pre-pit signal and (ii) the detected pre-pit signal, for the wobbling signal in a plurality of cycles thereof;

an averaging device for averaging the detected phase difference over the plurality of cycles of the wobbling signal; and a gate signal generating device for generating the gate signal on the basis of the averaged phase difference.

5. A pre-pit signal detecting apparatus according to claim 4, wherein said gate signal generating device generates the gate so that the averaged phase difference is coincident with a central timing of the gate signal.

6. An information recording apparatus for recording record information onto a record medium on which record control information for controlling a recording operation of said information recording apparatus is recorded in advance by forming a pre-pit on said record medium, comprising (A) a pre-pit signal detecting apparatus for detecting a pre-pit signal corresponding to the pre-pit when said information recording apparatus records the record information onto said record medium, said pre-pit signal detecting apparatus comprising:

an extracting device, to which a reproduction signal of said record medium is inputted, for extracting and outputting a predetermined signal component, which is used for detecting the pre-pit signal, out of the inputted reproduction signal;

an input controlling device for inputting a standard signal, which is set in advance, to said extracting device in place of the reproduction signal before the pre-pit signal is detected and inputting the reproduction signal to said extracting device when the pre-pit signal is detected;

a phase difference detecting device for comparing the standard signal outputted by said extracting device with the standard signal inputted by said input controlling device, and for detecting a phase difference generated between the compared standard signals due to an extracting operation of said extracting device before the pre-pit signal is detected; and a pre-pit detecting device for detecting the pre-pit signal on the basis of the extracted predetermined signal component while canceling the detected phase difference, and (B) a recording device for recording the record information onto said record medium on the basis of the detected pre-pit signal.

7. An information recording apparatus according to claim 6, wherein said extracting device comprises:

a filtering device for extracting a partial signal including the pre-pit signal from the reproduction signal, which is generated in response to a reflection light of a recording light beam irradiated onto said record medium; and a gate signal generating device for generating a gate signal to extract the pre-pit signal from the extracted partial signal.

8. An information recording apparatus according to claim 7, wherein said pre-pit detecting device comprises a phase controlling device for controlling a phase of the extracted partial signal so as to cancel the detected phase difference and then outputting it to said gate signal generating device.

9. An information recording apparatus for recording record information onto a record medium on which record control information for controlling a recording operation of said information recording apparatus is recorded in advance by forming a pre-pit and a wobbling track having a phase corresponding to the pre-pit on said record medium, comprising (A) a pre-pit signal detecting apparatus for detecting a pre-pit signal corresponding to the pre-pit from a reproduction signal corresponding to a reflection light of a recording light beam irradiated onto said record medium when said information recording apparatus records the record information onto said record medium, said pre-pit signal detecting apparatus comprising:

a first detecting device for detecting the pre-pit signal corresponding to a plurality of pre-pits on the basis of a gate signal to extract the pre-pit signal from the reproduction signal;

a second detecting device for detecting a wobbling signal corresponding to a wobble of the wobbling track;

a phase difference detecting device for detecting a phase difference between (i) the wobbling signal corresponding to the detected pre-pit signal and (ii) the detected pre-pit signal, for the wobbling signal in a plurality of cycles thereof;

an averaging device for averaging the detected phase difference over the plurality of cycles of the wobbling signal; and a gate signal generating device for generating the gate signal on the basis of the averaged phase difference, and (B) a recording device for recording the record information onto said record medium on the basis of the detected pre-pit signal.

10. An information recording apparatus according to claim 9, wherein said gate signal generating device generates the gate signal so that the averaged phase difference is coincident with a central timing of the gate signal.

* * * * *